(12) United States Patent
Arnault et al.

(10) Patent No.: US 12,249,879 B2
(45) Date of Patent: Mar. 11, 2025

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Samuel Viault, Saint-Antoine-du-Rocher (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 18 days.

(21) Appl. No.: 18/163,308

(22) Filed: Feb. 2, 2023

(65) Prior Publication Data
US 2023/0261554 A1    Aug. 17, 2023

(30) Foreign Application Priority Data

Feb. 11, 2022  (FR) ..................... 2201202

(51) Int. Cl.
*H02K 11/40* (2016.01)
*H01R 39/38* (2006.01)
*H01R 39/39* (2006.01)

(52) U.S. Cl.
CPC .......... *H02K 11/40* (2016.01); *H01R 39/385* (2013.01); *H01R 39/39* (2013.01)

(58) Field of Classification Search
CPC ........ H02K 11/40; H02K 5/173; H02K 13/00; H01R 39/385; H01R 39/39; H01R 39/64; H01R 39/24; H01R 4/64; H01R 2201/10; F16C 19/06; F16C 41/002; F16C 2226/76; H05F 3/02
See application file for complete search history.

(56) References Cited

U.S. PATENT DOCUMENTS

| | | | |
|---|---|---|---|
| 2004/0218843 A1* | 11/2004 | Jennes | F16C 19/06 |
| | | | 384/498 |
| 2006/0007609 A1 | 1/2006 | Oh et al. | |
| 2012/0207420 A1 | 8/2012 | Bostwick | |
| 2019/0296617 A1 | 9/2019 | Hubert et al. | |

(Continued)

FOREIGN PATENT DOCUMENTS

| | | | | |
|---|---|---|---|---|
| DE | 102020121735 A1 | 6/2021 | | |
| DE | 102020121736 A1 * | 6/2021 | ............. | H02K 11/40 |

(Continued)

OTHER PUBLICATIONS

English translation of DE-102020121735-A1 (Year: 2021).*

(Continued)

*Primary Examiner* — Tulsidas C Patel
*Assistant Examiner* — Joshua Kiel M Rodriguez
(74) *Attorney, Agent, or Firm* — J-TEK LAW PLLC; Scott T. Wakeman; Mark A. Ussai

(57) ABSTRACT

A grounding brush assembly includes a grounding brush and a mounting plate. The mounting plate includes a radial main body and a plurality of tongues for axially and radially retaining the brush, the tongues extending from the main body and being spaced apart from one another in the circumferential direction. The mounting plate further includes a plurality of centering tabs which extend from the main body and are offset radially outwardly at least partially with respect to the tongues.

12 Claims, 14 Drawing Sheets

(56) References Cited

U.S. PATENT DOCUMENTS

| | | |
|---|---|---|
| 2021/0021180 A1 | 1/2021 | Hubert et al. |
| 2021/0044178 A1 | 2/2021 | Weber et al. |
| 2021/0310518 A1 | 10/2021 | Berruet et al. |
| 2021/0310520 A1 | 10/2021 | Arnault et al. |
| 2021/0364041 A1 | 11/2021 | Berruet et al. |
| 2023/0013562 A1 | 1/2023 | Schamin et al. |

FOREIGN PATENT DOCUMENTS

| | | |
|---|---|---|
| FR | 3108956 A1 | 10/2021 |
| FR | 3109036 A1 | 10/2021 |
| FR | 3110650 A1 | 11/2021 |
| FR | 3110651 A1 | 11/2021 |
| WO | 2019037807 A1 | 2/2019 |

OTHER PUBLICATIONS

Preliminary Search Report and Written Opinion from the French Patent Office dated Oct. 24, 2022 in related No. FR2201202, and translation thereof.
Preliminary Search Report and Written Opinion from the French Patent Office dated Oct. 24, 2022 in related No. FR2201203, and translation thereof.
Unpublished U.S. Appl. No. 18/163,311.

\* cited by examiner

GROUNDING BRUSH ASSEMBLY

CROSS-REFERENCE

This application claims priority to French Patent Application No. 2201202 filed on Feb. 11, 2022, the entire contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between the housing of the electric motor or machine and the rotary shaft so as to support this shaft.

In operation, as the shaft rotates, an electrical potential difference can appear between the shaft and the housing of the electric motor or machine, which produces an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is known to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

However, it is necessary to manufacture grounding brushes for each shape and size of the rotary shaft and of the housing of the electric motor.

US Patent Publication No. 2021/0021180 discloses a grounding brush assembly comprising a grounding brush including a plurality of conductive fibers and an annular mounting plate provided with a plurality of tongues for radially and axially retaining the grounding brush and with an annular outer flange radially surrounding the brush and the tongues. The tongues are formed by permanent plastic deformation of the mounting plate.

However, a grounding brush assembly of this kind may not be suitable for electric motors having a small or limited radial space between the housing and the rotary shaft.

Specifically, with the solution in the noted U.S. Patent Publication, as the radial distance between the bore of the housing of the electric motor and the outer surface of the rotary shaft decreases, it becomes more difficult to form the retaining tongues of the mounting plate.

It is understood that there is a need to propose a grounding brush assembly that can be adapted to the variation in diameters of shafts and housings used in electric motors, while being suitable for electric motors having a small/limited radial space between the housing and the rotary shaft.

SUMMARY OF THE INVENTION

The invention relates to a grounding brush assembly comprising a grounding brush and a brush mounting plate configured to axially and radially retain the brush.

The brush comprises a support and a plurality of conductive fibers mounted in the support.

The mounting plate comprises a main body and a plurality of retaining tongues for axially and radially retaining the brush, the tongues extending from the main body and being spaced apart from one another in the circumferential direction.

According to a general feature, the mounting plate further comprises a plurality of centering tabs which extend from the main body.

The centering tabs are spaced apart from one another in the circumferential direction and are offset radially outwardly at least in part with respect to the tongues.

Each centering tab includes a connecting portion extending outwardly from the main body and a centering portion extending at least axially from the connecting portion and locally surrounding the support of grounding brush while remaining radially separated from (i.e., spaced radially apart from) the support. The centering portion is delimited in the circumferential direction by free front faces.

Thus, the centering portions of the tabs are independent of the retaining tongues and of the body of the mounting plate. There is no connection in the circumferential direction between the front faces of the centering portions of the tabs and between the retaining tongues and the body.

The centering portions of the tabs define the outer diameter of the mounting plate.

This solution makes it possible to have a universal design irrespective of the radial distance present between the bore of the housing of the electric motor and the outer surface of the rotary shaft, between which the assembly is intended to be mounted.

One and the same type of grounding brush can be adapted to various outer diameters by adapting the radial dimension of the centering tabs of the mounting plate.

Furthermore, the design of the mounting plate with centering tabs makes it possible to simplify mounting within the bore of the housing of the associated electric motor in view of the more flexible nature of the tabs in comparison with an annular outer flange as is the case with conventional mounting plates.

Preferably, the connecting portion of each centering tab of the mounting plate extends outwardly from a cylindrical outer surface of the main body.

In one embodiment, the connecting portion extends radially outwardly from the cylindrical outer surface of the main body. The connecting portion may extend only radially, or alternatively, the connecting portion may extend both radially and axially, that is to say "obliquely".

The centering portion of each centering tab of the mounting plate may extend from a large-diameter edge of the radial portion. This facilitates the manufacture of the mounting plate, in particular when the latter is produced by cutting and stamping.

Advantageously, the centering portion of each centering tab of the mounting plate extends obliquely outwardly. This also increases the flexible nature of the centering tabs in the radial direction and also facilitates the mounting of the mounting plate in the bore of the housing of the associated electric motor. Moreover, this reduces the stresses that may be created in the connecting zone between the radial portion and the centering portion of each centering tab during mounting.

As an alternative, the centering portion of each centering tab of the mounting plate may extend only axially.

According to a particular design, the centering portion of at least one of the centering tabs of the mounting plate is extended radially outwardly on the side opposite to the retaining tongues by a folded rim.

This design ensures good axial positioning of the assembly inside the housing of the associated electric motor by providing a groove or a shoulder in the bore of the housing, against which this folded rim comes into abutment.

When this particular design is implemented, only one centering tab of the mounting plate may be provided with the folded rim. As an alternative, several tabs or all of the centering tabs may be equipped with the folded rim.

In one embodiment, the centering tabs of the mounting plate extend axially from the same side of the plate from which the tongues extend. As an alternative, the centering tabs may extend axially from the opposite side of the plate to the tongues.

In a particular embodiment, the root of each centering tab of the mounting plate is positioned in the circumferential direction between two successive retaining tongues.

In one embodiment, a circumferential space is formed between each centering tab of the mounting plate and each adjacent retaining tongue. In this case, the centering tabs of the mounting plate and the tongues extend axially from the same side.

Each retaining tongue of the mounting plate may extend axially from the cylindrical outer surface of the main body.

The body of the mounting plate may comprise two opposite front faces which delimit the axial thickness of the body.

The retaining tongues and the centering tabs protrude with respect to one of these front faces of the body. Advantageously, the retaining tongues axially hold the support of the brush in axial abutment against the front face of the body.

In one embodiment, the number of retaining tongues is identical to the number of centering tabs, each tongue being disposed between two adjacent centering tabs. As an alternative, the number of retaining tongues differs from the number of centering tabs.

Preferably, the body of the mounting plate is annular. As an alternative, the body may be open at a point around its circumference (i.e., formed with a circumferential gap).

The mounting plate may be made of an electrically conductive material.

The invention also relates to an electric machine or motor comprising a housing, a shaft and at least one grounding brush assembly as defined above, mounted radially between the housing and the shaft and in radial contact with the shaft, in particular by means of the free end of the conductive fibers of the brush.

BRIEF DESCRIPTION OF THE SEVERAL VIEWS OF THE DRAWINGS

The present invention will be better understood on studying the detailed description of embodiments, given by way of non-limiting examples and illustrated by the appended drawings, in which.

DETAILED DESCRIPTION OF THE INVENTION

Figure 1:
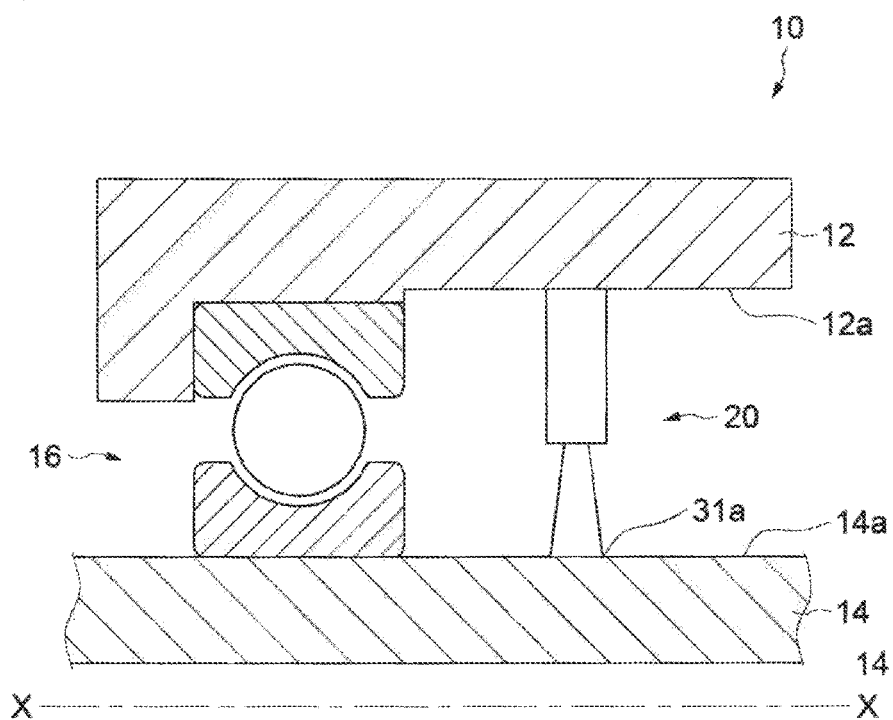
FIG. 1 is a view in axial section of a grounding brush assembly mounted radially between a rotary shaft and a housing of an electric motor.

FIG. 1 shows, in axial section, part of an electric motor 10 or machine comprising a fixed housing 12, a rotary shaft 14 rotatable about a central axis X-X, which is supported radially by a rolling bearing 16. In this instance, the bearing is of the ball type. As an alternative, it is possible to provide another type of rolling elements (e.g., cylindrical rollers, needles, etc.) or a journal bearing.

The motor 10 further comprises a grounding brush assembly 20 which is mounted radially between the bore 12a of the housing 12 and the outer cylindrical surface 14a of the rotary shaft 14.

The grounding brush assembly 20 serves or functions to continuously dissipate the electrical charge accumulating on the shaft 14 of the motor when the motor is in operation, by transferring this charge to the housing 12.

Figure 2:
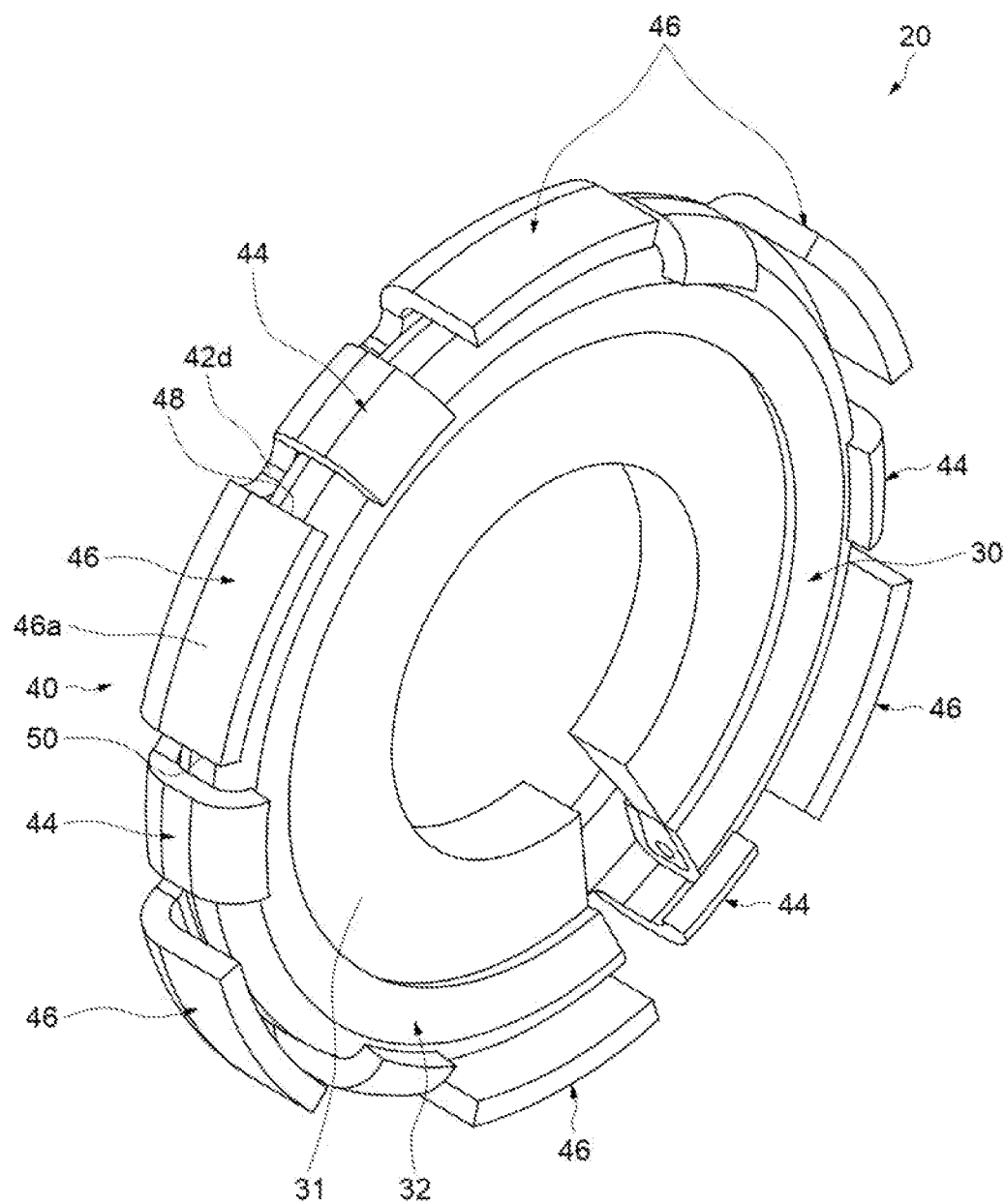
FIG. 2 is a perspective view of a grounding brush assembly according to a first exemplary embodiment of the invention.
Figure 3:
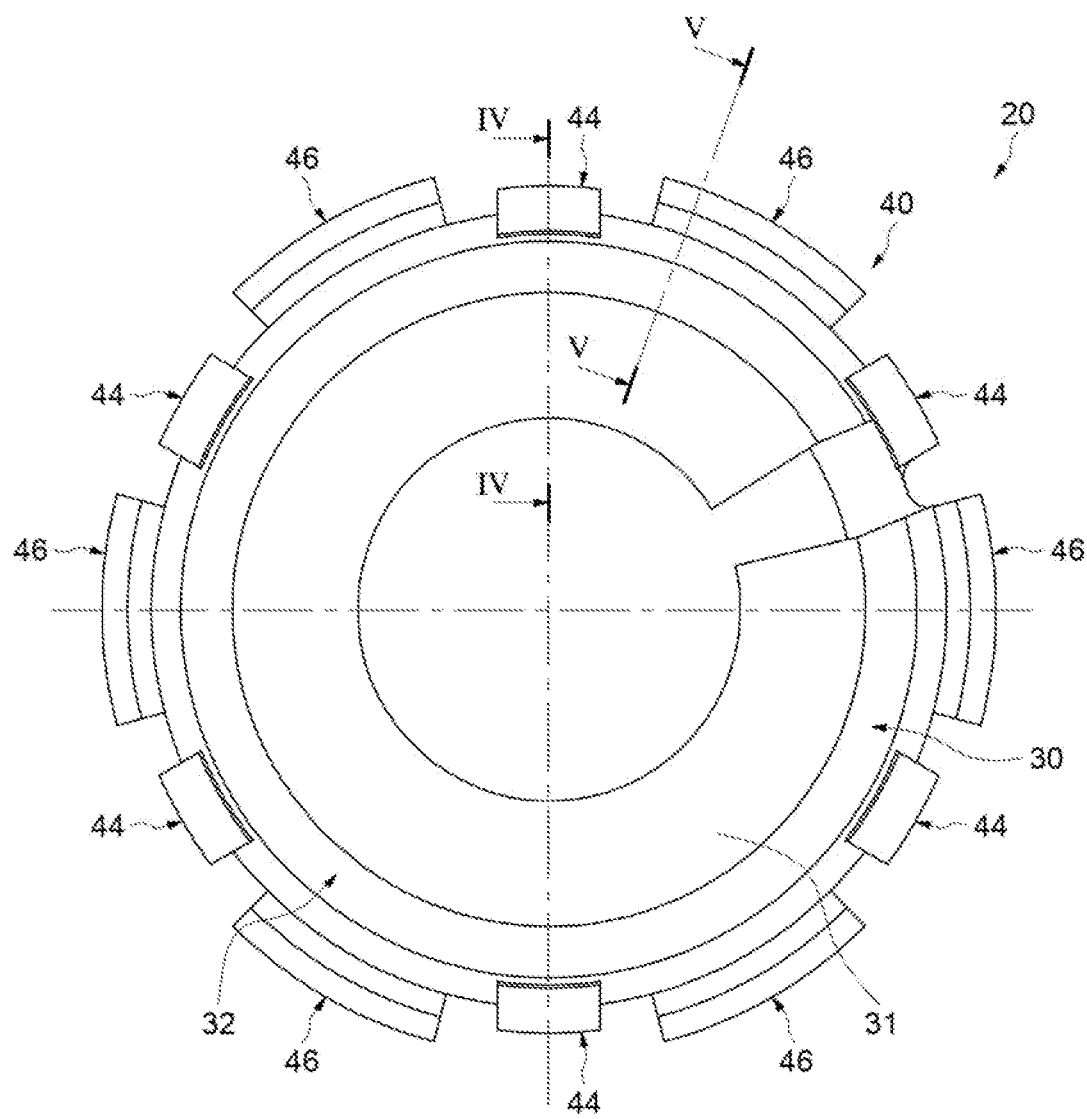
FIG. 3 is a front view of the grounding brush assembly in FIG. 2.

As illustrated in FIGS. 2 and 3, the grounding brush assembly 20 has a generally annular shape. The assembly 20 comprises a grounding brush 30 and a brush mounting plate 40 which is configured to axially and radially retain the brush 30.

The brush 30 comprises a plurality of individual conductive fibers 31 which are intended to come around or be disposed about the rotary shaft 14 of the motor 10. The conductive fibers 31 may be made of carbon, stainless steel, conductive plastics, such as fibers made of acrylic or nylon.

The brush 30 further comprises a holding or support member 32, in the interior of which the conductive fibers 31 are mounted. In the exemplary embodiment illustrated, the support 32 is in the form of an open ring.

Figure 4:
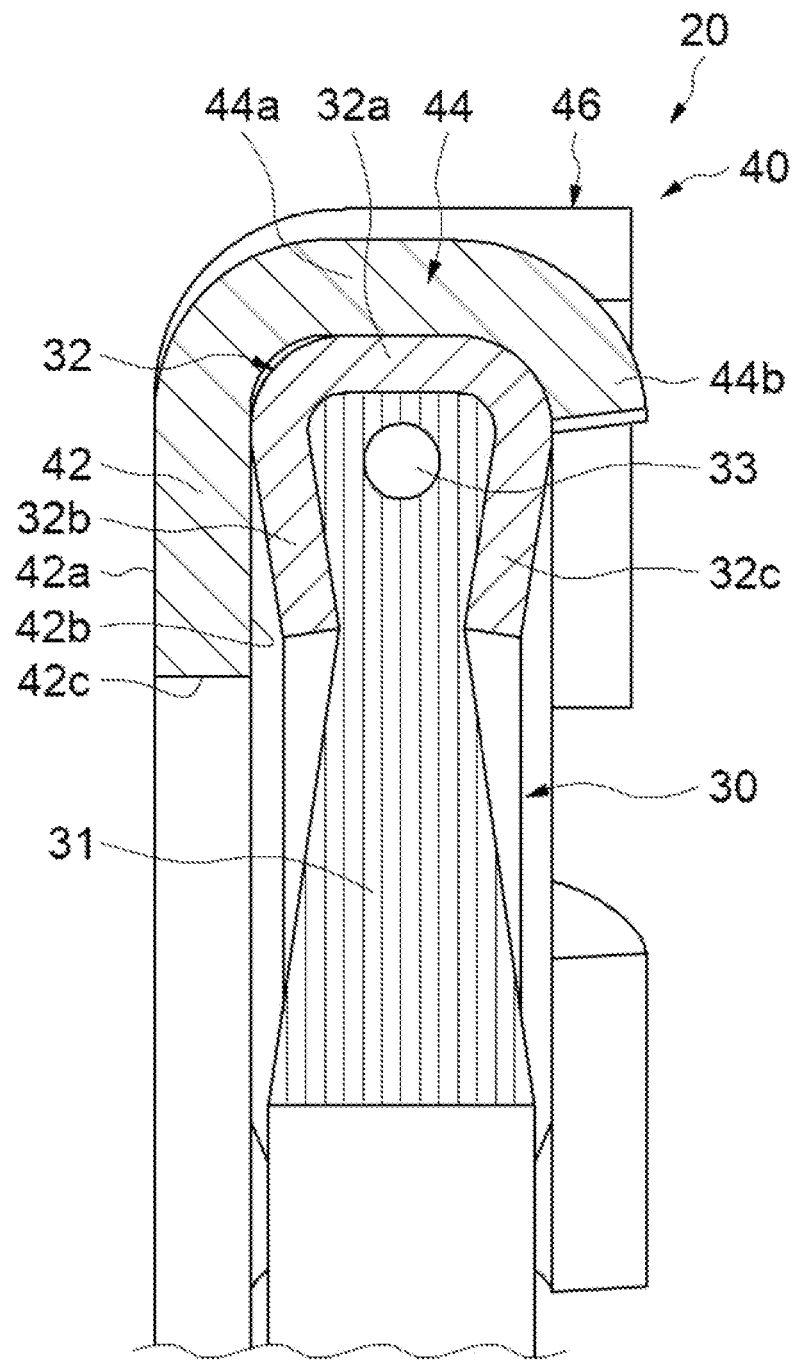
FIG. 4 is a view in section along line IV-IV in FIG. 3.

As illustrated more clearly in FIG. 4, the support 32 comprises an annular axial portion 32a and two annular lateral portions 32b, 32c extending radially inwardly in order to grip the conductive fibers 31. The axial portion 32a and the two lateral portions 32b, 32c delimit a channel which is radially open on the inside and in the interior of which one end of the conductive fibers 31 is positioned.

In the example illustrated, the lateral portions 32b, 32c extend obliquely inwardly from the axial portion 32a. As a variant, the lateral portions 32b, 32c could extend radially. In the example illustrated, the conductive fibers 31 are bent around a connecting wire 33 of the support 32.

The free distal end 31a of the conductive fibers 31 is intended to come into radial contact with the outer surface 14a of the rotary shaft 14 of the motor 10.

The brush 30 is in the form of an open ring having a first end which is circumferentially spaced apart from a second end, which is circumferentially opposite the first end, as shown in FIGS. 2 and 3. Such a circumferential spacing between two ends of the brush 30 allows the brush to adapt to a different diameter of the shaft 14 of the motor 10.

Generally, the first and second ends of the brush 30 are not attached to one another, but may be in contact with one another. As a variant, it remains possible to attach the first end and the second end of the brush 30 to one another.

The mounting plate 40 of the brush 30 comprises an annular radial main body 42 and a plurality of retaining tongues 44 for axially and radially retaining the brush 30, which extend from the main body 42.

As will be described in more detail below, the mounting plate 40 also comprises a plurality of mounting and centering sectors or tabs 46 extending from the main body 42.

Referring again to FIG. 4, the body 42 comprises two opposite front faces 42a, 42b which delimit the axial thickness of the body 42. The body 42 also comprises a cylindrical bore 42c and a cylindrical axial outer surface 42d (FIG. 2) radially opposite to the bore 42c.

Each tongue 44 extends from the cylindrical outer surface 42d of the body 42. Each tongue 44 protrudes axially with respect to the front face 42b of the body 42. Each tongue 44 locally radially surrounds the support 32 of the brush 30 and is in radial contact with the axial portion 32a of the support 32. The support 32 of the grounding brush 30 is held axially bearing against the front face 42b of the body 42 by the tongues 44. The tongues 44 serve for axially and radially retaining the grounding brush 30.

Each tongue 44 comprises an axial portion 44a extending axially from the cylindrical outer surface 42d of the body 42, and a radially inwardly folded portion 44b which is provided at the free end of the axial portion 44a. The axial portion 44a of each tongue 44 is in the form of a cylindrical portion. The folded portion 44b of each tongue 44 serves for axially retaining the grounding brush 30. The folded portion 44b of each tongue 44 is in axial contact against the lateral portion 32c of the support 32. The tongues 44 are in this case identical.

As illustrated in FIGS. 2 and 3, the tongues 44 of the mounting plate 40 are spaced apart from one another in the circumferential direction, in a regular or evenly spaced manner. As an alternative, it could be possible to provide an irregular circumferential spacing. The tongues 44 are distributed circumferentially around the main body 42. In the exemplary embodiment illustrated, the number of tongues 44 is six. As an alternative, it is possible to provide a different number of tongues 44.

As indicated above, the mounting plate 40 also comprises centering tabs 46 extending from the main body 42. The tabs 46 extend from the cylindrical outer surface 42d of the main body 42.

Figure 5:
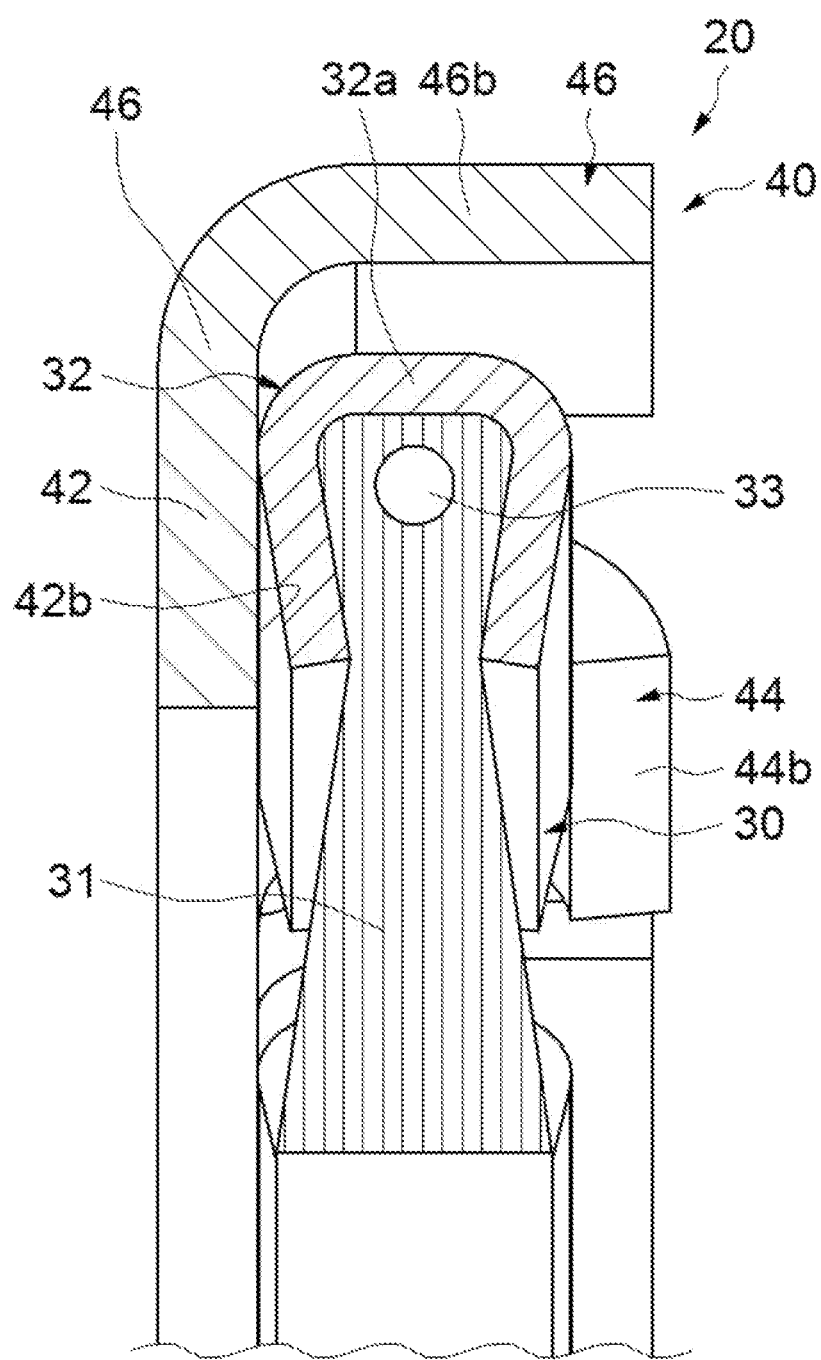
FIG. 5 is a view in section along line V-V in FIG. 3.
Figure 6:
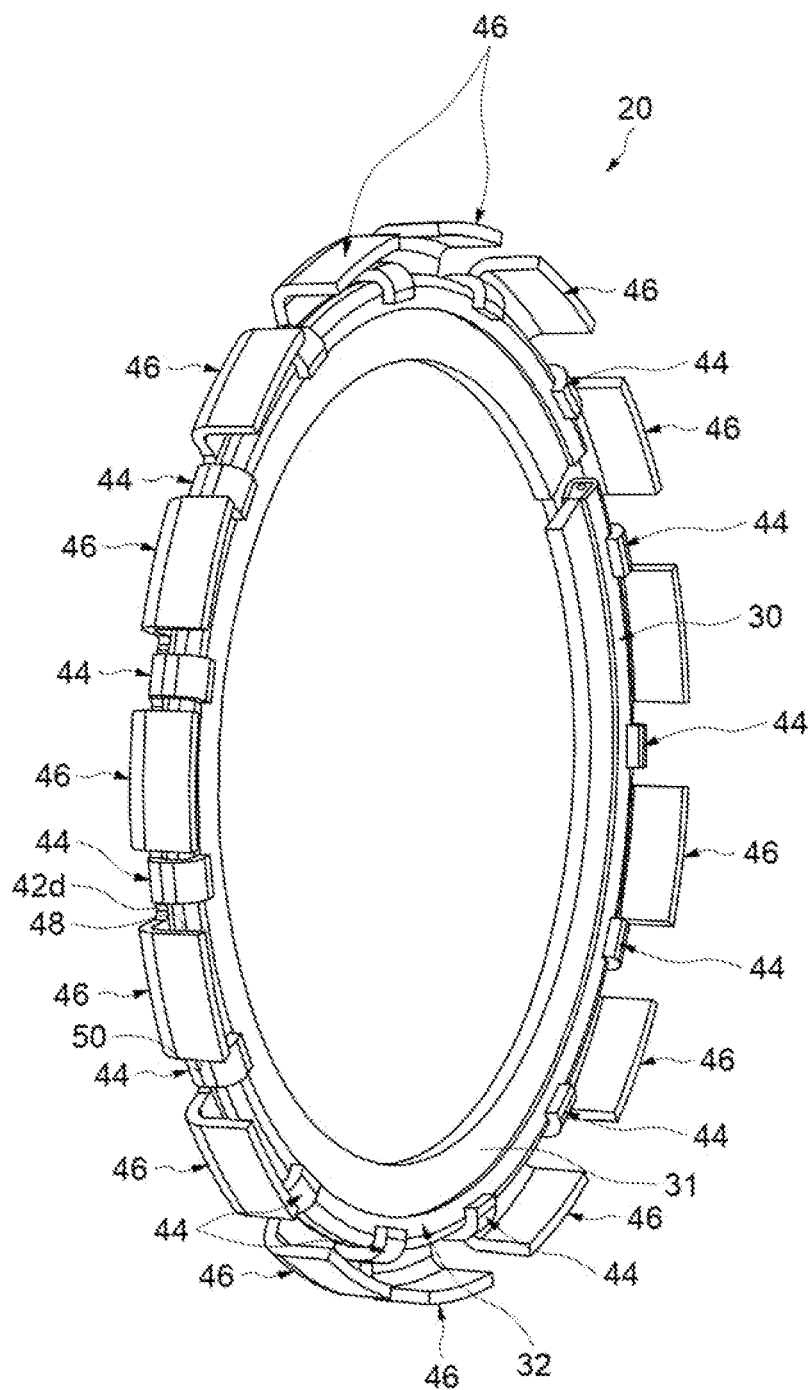
FIG. 6 is a perspective view of a grounding brush assembly according to a second exemplary embodiment of the invention.
Figure 7:
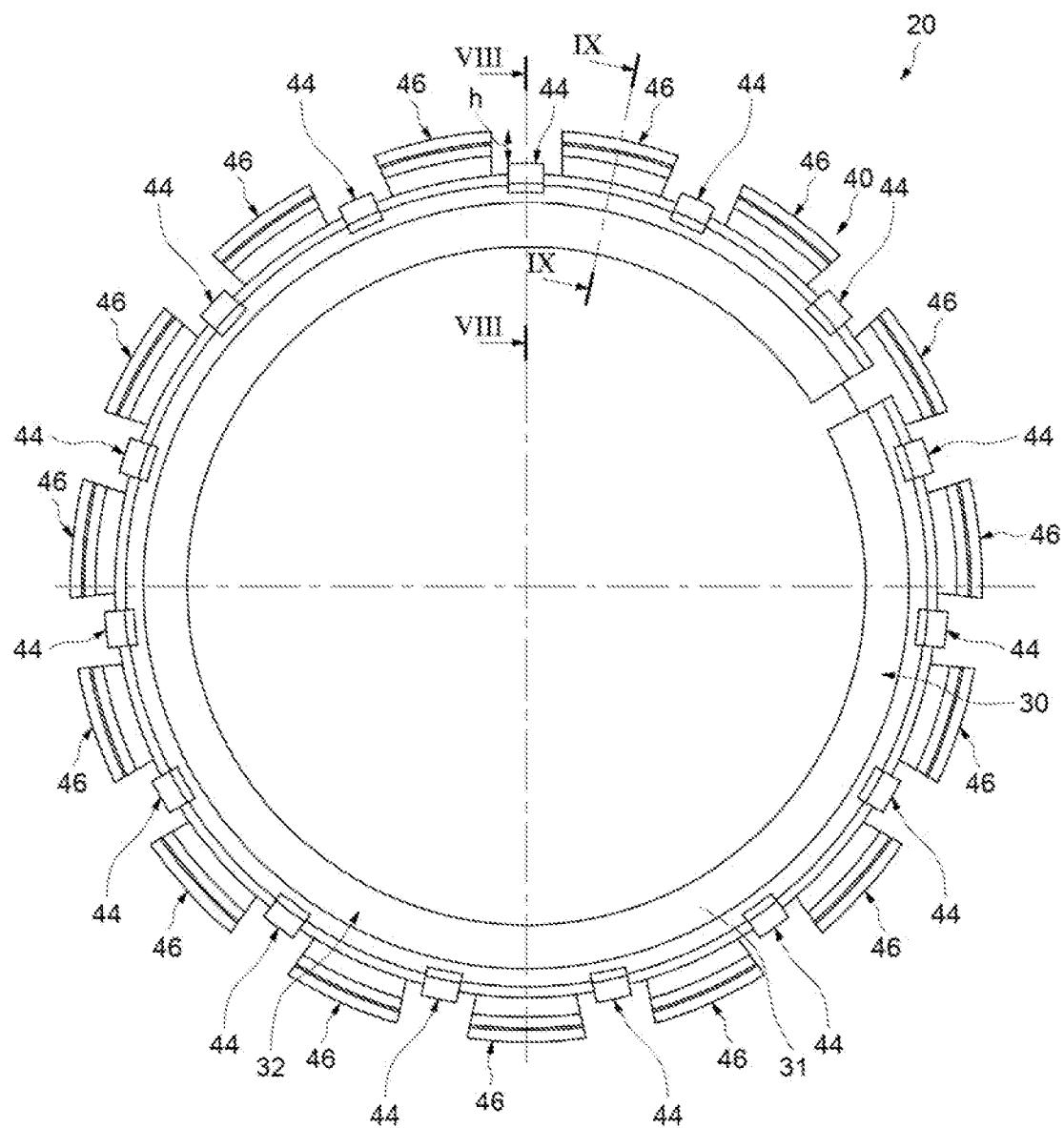
FIG. 7 is a front view of the grounding brush assembly in FIG. 6.
Figure 8:
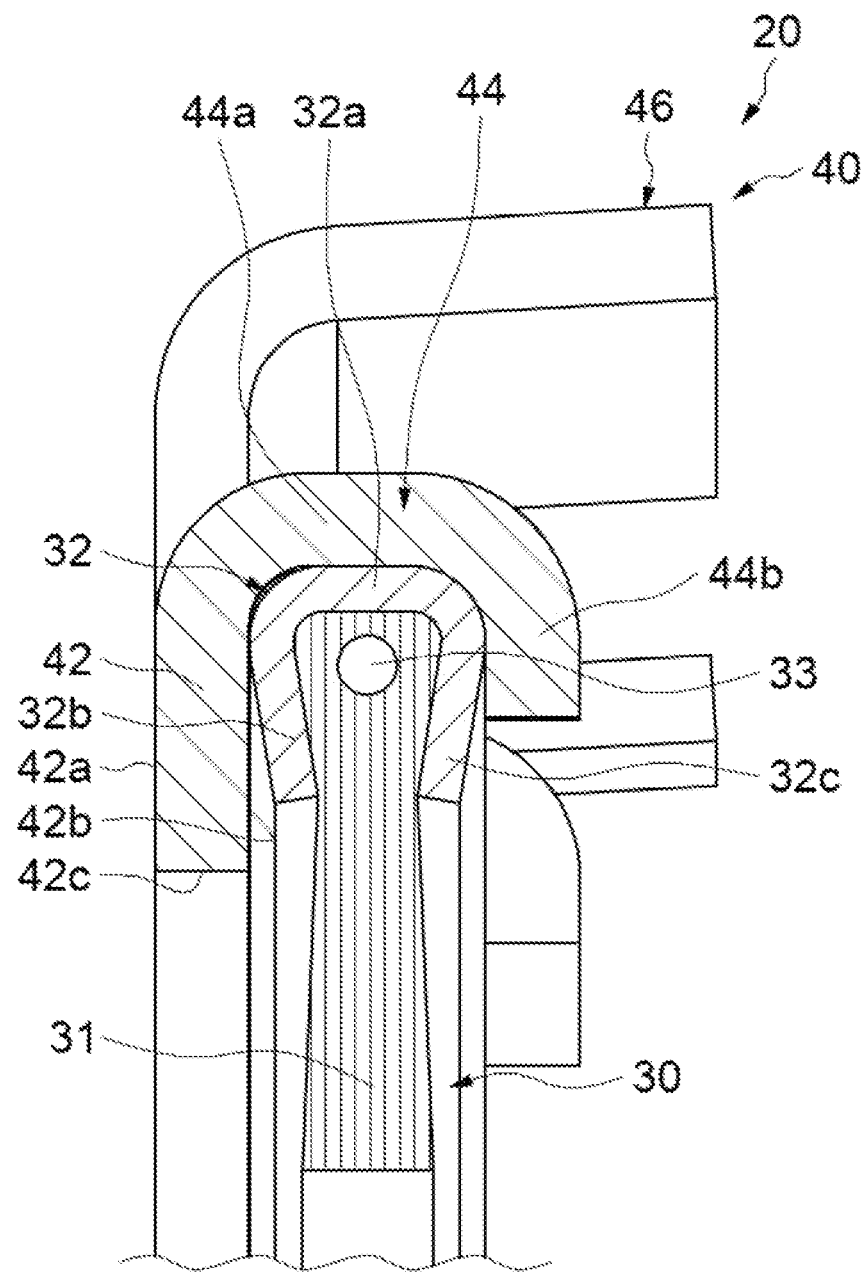
FIG. 8 is a view in section along line VIII-VIII in FIG. 7.
Figure 9:
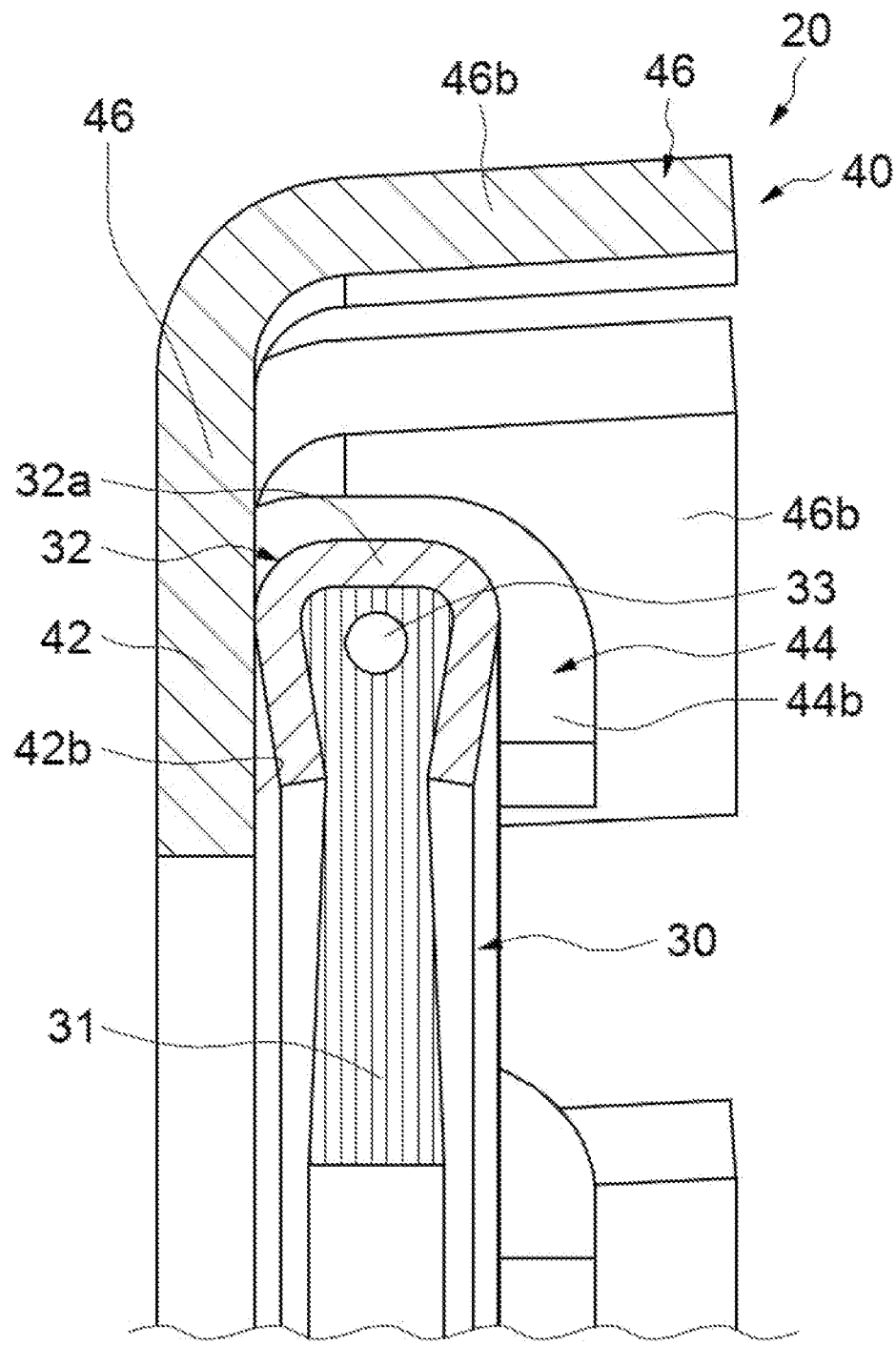
FIG. 9 is a view in section along line IX-IX in FIG. 7.
Figure 10:
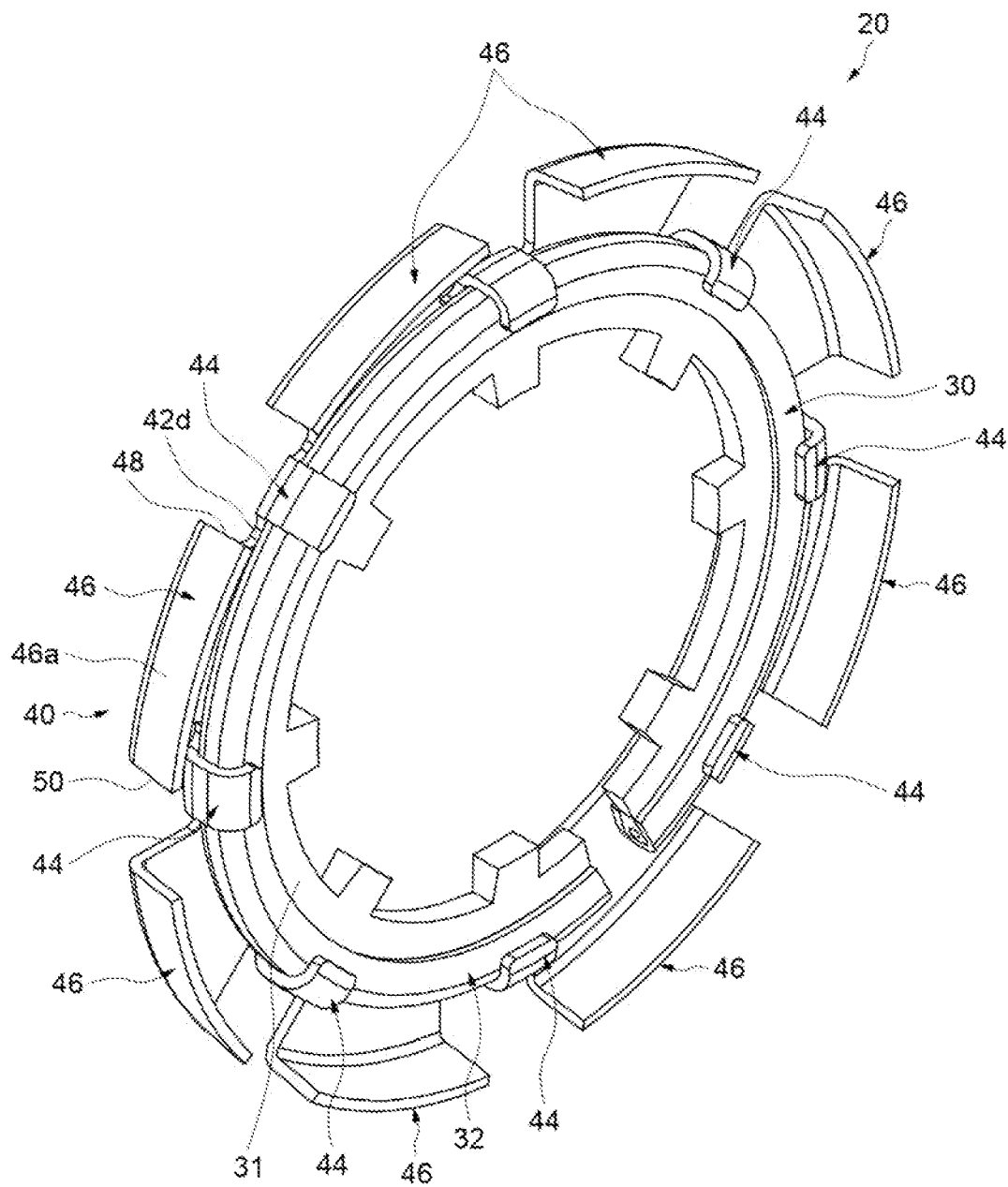
FIG. 10 is a perspective view of a grounding brush assembly according to a third exemplary embodiment of the invention.
Figure 11:
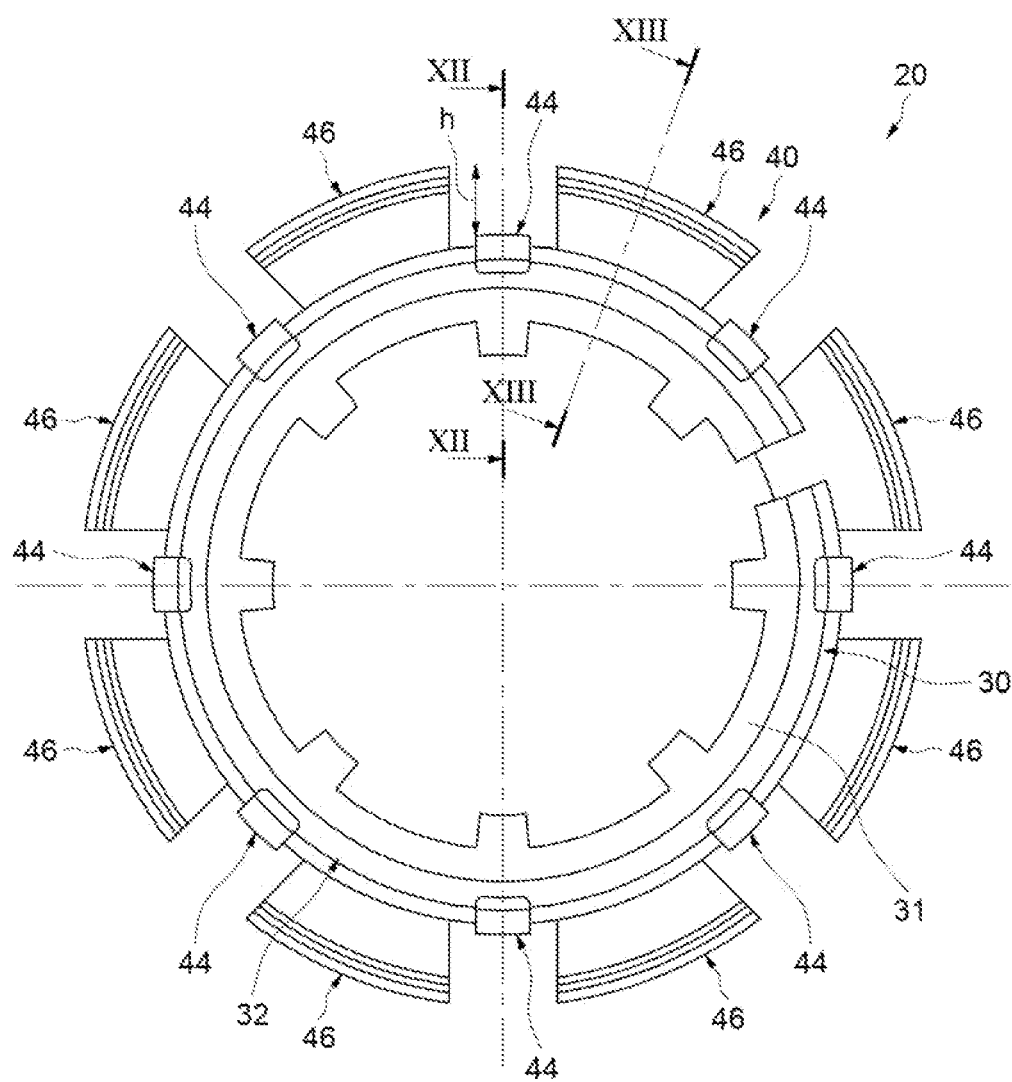
FIG. 11 is a front view of the grounding brush assembly in FIG. 10.
Figure 12:
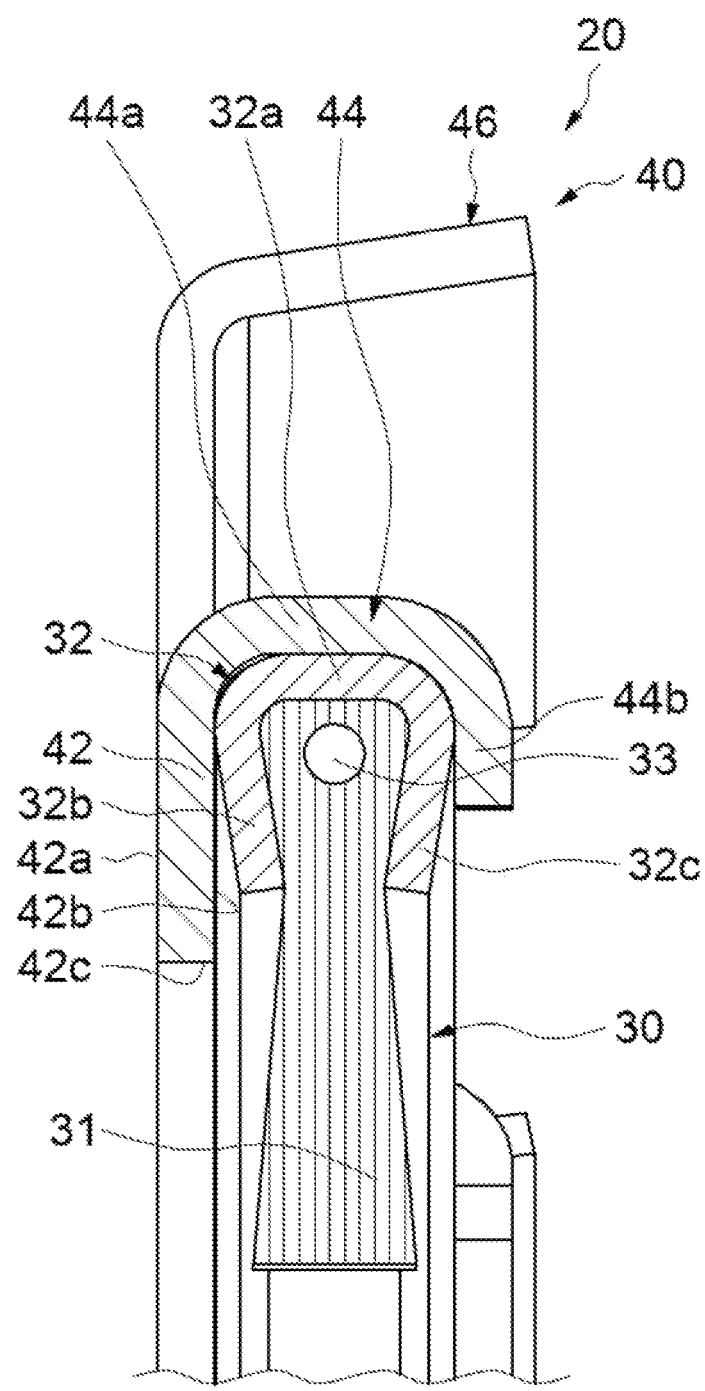
FIG. 12 is a view in section along line XII-XII in FIG. 11.
Figure 13:
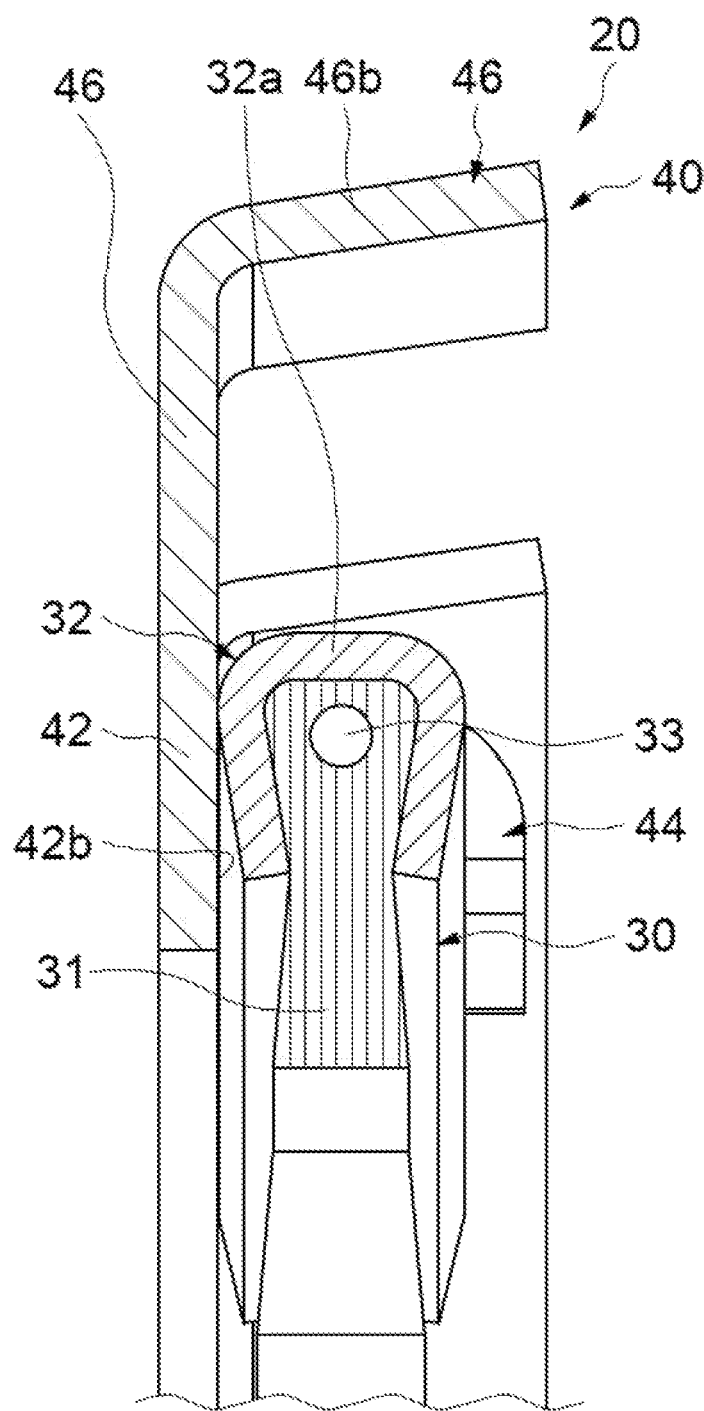
FIG. 13 is a view in section along line XIII-XIII in FIG. 11.

Referring to FIG. 5, each tab 46 protrudes axially with respect to the front face 42b of the body 42. Each tab 46 locally radially surrounds the support 32 of the brush 30 while remaining separated therefrom. The tabs 46 are partially offset radially outwards with respect to the tongues 44. The tabs 46 preferably extend axially from the same side of the body 42 as the tongues 44. As an alternative, the tabs 46 could extend axially from the opposite side of the body 42 to the tongues 44. The tabs 46 are in this case identical.

Each centering tab 46 includes a radial portion 46a extending radially outwardly from the body 42 and a centering portion 46b extending axially from the radial portion 46a and locally radially surrounding the support 32 while remaining radially separated therefrom (i.e., spaced radially outwardly from the support 32). The centering portions 46b of the tabs 46 collectively define the outer diameter of the mounting plate 40.

The radial portion 46a of each tab 46 forms a connecting portion which connects the associated centering portion 46b to the body 42. The radial portion 46a of each tab 46 extends radially outwardly from the outer surface of the body 42.

The centering portion 46b extends axially from a large-diameter edge of the associated radial portion 46a. The centering portion 46b of each tab 46 is in the form of a cylindrical portion. The bore in the central portion 46b of each tab 46 is radially spaced apart from the support 32 of the brush 30 by a non-zero radial distance. The outer surfaces of the centering portions 46b of the tabs 46 define the outer diameter of the mounting plate 40. In this exemplary embodiment, the centering portions 46b of the tabs 46 are offset at least partially radially outwardly with respect to the tongues 44.

Referring again to FIG. 2, the centering portion 46b of each tab 46 comprises two opposite front faces 48, 50 which delimit the central portion in the circumferential direction. The centering portion 46b of each tab 46 extends in a continuous manner in the circumferential direction between its two front faces 48, 50. The front faces 48, 50 of each centering portion 46b are free. There is no connection between the centering portion 46b of each tab 46 with the body 42 or with the tongues 44.

As illustrated in FIGS. 2 and 3, the tabs 46 are spaced apart from one another in the circumferential direction, in a regular or evenly spaced manner. As an alternative, it could be possible to provide an irregular circumferential spacing (i.e., circumferentially staggered). The tabs 46 are distributed circumferentially around the main body 42.

Each centering tab 46 is positioned in the circumferential direction between two immediately successive or adjacent tongues 44. Each tab 46 is spaced apart in the circumferential direction from the two immediately adjacent tongues 44. In other words, a circumferential space is formed between each tab 46 and each immediately adjacent tongue 44. There is no portion which connects a tab 46 to an adjacent tongue 44 in the circumferential direction.

In this instance, each tab 46 has a circumferential dimension greater than that of the tongues 44. By way of indication, the circumferential dimension of the tabs 46 may be, for example, between 10° and 45°. In the exemplary embodiment illustrated, the number of centering tabs 46 is six. As an alternative, it is possible to provide a different number of tabs 46. In the exemplary embodiment illustrated the number of centering tabs 46 is equal to the number of retaining tongues 44. As an alternative, it is possible to provide a number of tabs 46 which differs from the number of tongues 44.

In the exemplary embodiment illustrated, the tabs 46 have an axial dimension substantially equal to the tongues 44. As an alternative, it is possible to provide the tabs 46 with axial dimensions different from the axial dimensions of the tongues 44.

The mounting plate 40 is preferably produced by cutting and stamping. The mounting plate 40 is made of a conductive material such as aluminum, stainless steel, bronze, copper or another appropriate material.

In this exemplary embodiment, the centering portions 46b of the tabs 46 of the mounting plate 40 extend only axially.

The exemplary embodiment illustrated in FIGS. 6 to 9, in which identical elements bear the same references, differs in particular from the preceding example in that the centering portions 46b of the tabs 46 extend obliquely outwardly. The centering portions 46b therefore extend both axially and radially. The centering portions 46b have a conical or frustoconical shape. In this exemplary embodiment, the centering portions 46b of the tabs 46 are entirely offset radially outwardly with respect to the tongues 44.

With respect to the preceding example, the radial height h (FIG. 7) separating the outer surface of the tongues 44 and the outer surface of centering portions 46b of the mounting plate 40 is increased. The radial dimension of the radial portion 46a of each tab 46 is thus also increased. Furthermore, in this example, the number of tongues 44 and tabs 46 of the mounting plate is increased with respect to the preceding example.

The exemplary embodiment illustrated in FIGS. 10 to 13, in which identical elements bear the same references, differs primarily from the preceding example in that the radial height h (FIG. 11) separating the outer surface of the tongues 44 and the outer surface of centering portions 46b of the mounting plate 40 is increased. Therefore, the radial dimension of the radial portion 46a of each tab 46 is also increased. In this example, the number of tongues 44 and tabs 46 of the mounting plate 40 is reduced with respect to the preceding example.

Figure 14:
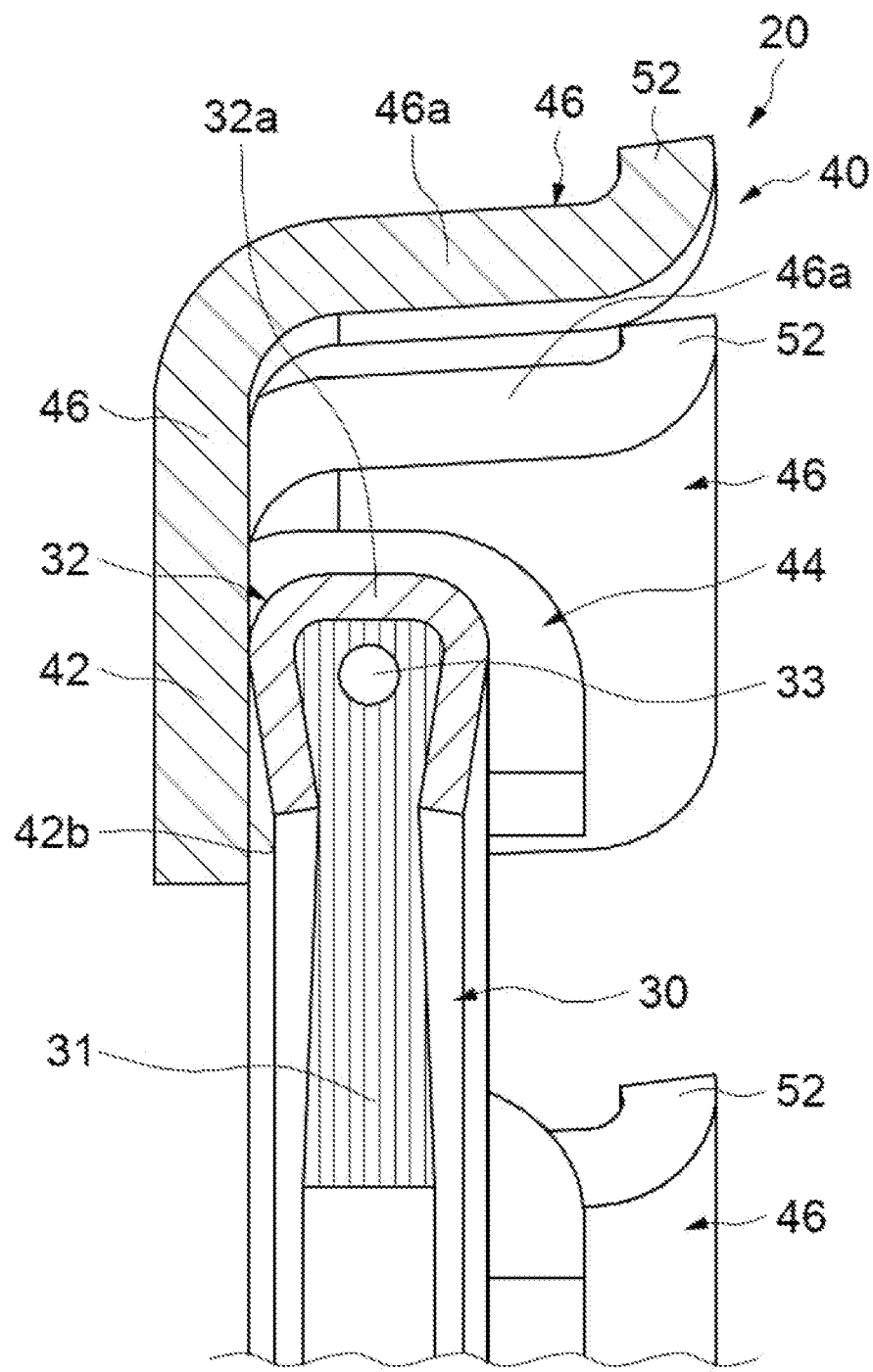
FIG. 14 is a view in partial section of the mounting plate of a grounding brush assembly according to a fourth exemplary embodiment of the invention.

The exemplary embodiment illustrated in FIG. 14, in which identical elements bear the same references, differs from the second exemplary embodiment in that each tab 46 of the mounting plate 40 includes a folded rim 52 which extends from the centering portion 46b radially outwardly from the side opposite to the tongues 44. The rim 52 of each tab 46 extends radially outwardly. The rim 52 of each tab 46 extends from the free end of the centering portion 46b of each tab 46.

This design of the tabs 46 of the mounting plate ensures good axial positioning of the assembly 20 inside the housing 12 of the associated electric motor 10 by providing a groove or a shoulder in the bore of the housing 12, against which the rims 52 of the tabs 46 come into abutment.

The grounding brush assembly 20 according to the invention is easy to manufacture, for example by stamping, and can be adapted to the variation in diameters of shafts and housings used in electric motors, while being suitable for electric motors having a small or limited radial space between the housing and the rotary shaft.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:
1. A grounding brush assembly comprising:
a grounding brush including a support and a plurality of conductive fibers mounted in the support, and
a brush mounting plate including a main body and a plurality of tongues for axially and radially retaining the brush, the tongues extending from and being integrally formed with the main body and being spaced apart from one another in the circumferential direction, and a plurality of centering tabs extending from and being integrally formed with the main body, spaced apart from each other in the circumferential direction and offset radially outwardly at least partially with respect to the tongues, each centering tab including a connecting portion extending outwardly from the main body and a centering portion extending at least axially from the connecting portion and locally surrounding the support of the grounding brush while remaining radially separated from the support, the centering portion being delimited in the circumferential direction by free front faces, each centering portion of the centering tabs being engageable with a housing.

2. The assembly according to claim 1, wherein the connecting portion of each centering tab of the mounting plate extends radially outwardly from a cylindrical outer surface of the main body.

3. The assembly according to claim 1, wherein the centering portion of each centering tab extends from a large-diameter edge of the connecting portion.

4. The assembly according to claim 1, wherein the centering portion of each centering tab extends obliquely outwardly.

5. The assembly according to claim 1, wherein the centering portion of each centering tab extends only axially.

6. The assembly according to claim 1, wherein the centering portion of at least one of the centering tabs of the mounting plate is extended radially outwardly by a folded rim.

7. The assembly according to claim 1, wherein a root of each centering tab of the mounting plate is positioned in the circumferential direction between two successive retaining tongues.

8. The assembly according to claim 7, wherein a circumferential space is formed between each centering tab of the mounting plate and each adjacent retaining tongue.

9. The assembly according to claim 1, wherein each retaining tongue of the mounting plate extends axially from a cylindrical outer surface of the main body.

10. An electric motor comprising a housing, a shaft and at least one grounding brush assembly according to claim 1, mounted radially between the housing and the shaft, and in radial contact with the shaft.

11. A grounding brush assembly comprising:
a grounding brush including a support and a plurality of conductive fibers mounted in the support, and
a brush mounting plate including a main body and a plurality of tongues for axially and radially retaining the brush, the tongues being integrally formed with and extending from the main body and being spaced apart from one another in the circumferential direction, and a plurality of centering tabs integrally formed with and extending from the main body, spaced apart from each other in the circumferential direction and offset radially outwardly at least partially with respect to the tongues, each centering tab including a connecting portion extending outwardly from the main body and a centering portion extending at least axially from the connecting portion and locally surrounding the support of the grounding brush while remaining radially separated from the support, the centering portion being delimited in the circumferential direction by free front faces, each centering portion of the centering tabs being engageable with a bore of a housing to mount the mounting plate within the housing.

12. The grounding brush assembly according to claim 11, wherein the connecting portion of each centering tab is disposed between two adjacent retaining tongues and is separated from each adjacent tongue by a circumferential space such that there is no connection between the front faces of the centering portions of the tabs and the retaining tongues.

* * * * *